3,424,571
HERBICIDAL COMPOSITION AND METHOD
André Bondouy, 87 Blvd. Suchet, and François-Joseph Biechler, 366 ter rue de Vaugirard, both of Paris, France
No Drawing. Filed July 14, 1964, Ser. No. 382,667
Claims priority, application France, July 26, 1963, 942,748; Feb. 3, 1964, 962,411
U.S. Cl. 71—92
Int. Cl. A01m 5/00, 9/02
13 Claims This invention is concerned with herbicidal compositions.

The present trend in total clearance of the vegetation, as is the custom in some industries and utilities, such as the storage areas of refineries and powder mills, railway lines, high-voltage transmission lines, and so on, is based on the use of persistent organic herbicides. These products must be very resistant to the micro-organisms found in the soil, must have good chemical stability and must have low solubility in water; the term "low-solubility herbicide" refers to any herbicidal compound which, in the presence of water, the liquid vehicle necessary for application, is in the form of solid particles in suspension in the vehicle. The most representative members of this class of persistent organic herbicides of low water solubility are the N-substituted derivatives of urea and the N-substituted derivatives of uracil.

The N-substituted derivatives of urea have the following general formula:

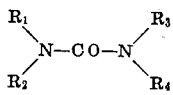

in which $R_1$, $R_2$, $R_3$, $R_4$ denote hydrogen atoms, alkyl radicals, such as methyl, ethyl and butyl, alkylol radicals, such as methylol, ethylol, propylol and butylol, aromatic radicals, such as phenyl, tolyl and xylyl, halogenated or nitrated aromatic radicals, such as monochlorophenyl, dichlorophenyl, mono and dinitrophenyl, or acylated and possibly halogenated radicals, such as acetyl and mono-, di-, or tri-chloro-acetyl. As examples of N-substituted derivatives of urea, there may be mentioned inter alia N - (4 - chlorophenyl) - N',N' - dimethylurea, N - (3,4-dichlorophenyl)-N',N'-dimethylurea, and N-(dichlorophenyl)-N'-methoxy-N'-methylurea. This family also covers the condensation products of halogenated aldehydes with urea whose representative member is 1,3-bis-(2,2,2-trichloro-1-hydroxyethyl)-urea.

The N-substituted derivatives of uracil have the following formula:

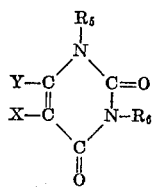

in which $R_5$ and $R_6$ represent hydrogen atoms or alkyl radicals, such as methyl, ethyl, propyl and isopropyl, and Y or X represents an alkyl radical, such as methyl, ethyl, propyl and isopropyl, provided that the other X or Y is a halogen: Cl, Br, I, F.

As examples of N-substituted derivatives of uracil there can be mentioned inter alia 5-bromo-3-isopropyl-6-methyl-uracil and 5-bromo-3-sec-butyl-6-methyl-uracil.

All these various low solubility persistent herbicides are applied by spraying or atomisation in the form of a suspension of the herbicide in water. The applicators must therefore have mechanical, pneumatic or hydraulic agitating means.

In addition, ready-for-use herbicidal suspensions of this kind cannot be stored for a long time unless they are continuously agitated, since otherwise a deposit of the insoluble ingredients is rapidly formed which cannot readily be returned into suspension. Another difficulty is that these aqueous herbicidal suspensions should preferably be applied before the weeds appear, i.e. at a time (end of winter) when there is definite risk of frost. Prolonged spells of temperatures below freezing point cause the aqueous vehicle to freeze, with the result of permanent and irreversible breaking of the suspension.

It is found in actual practice that most of the low solubility persistent organic herbicides of, for example, the substituted urea or the substituted uracil type, do not have a complete range of herbicidal activity and that, for this reason, other complementary herbicides must be added to them to effect complete removal of vegetation.

These complementary heribicides are water-soluble and are used in the form of aqueous solutions. They include, for instance, the following:

aminotriazole and its derivatives,
ammonium sulphamate,
boron derivatives,
sodium chlorate,
sodium 3-amino-2,5-dichlorobenzoate,
4,6-dinitro-O-sec-butylphenol,
sodium 2,2-dichloropropionate,
sodium 2-methyl-4-chlorophenoxy-acetate,
the sodium salt of 1,2-dihydro-pyridazine-3,6-dione,
1,1-dimethyl-4,4-dipyridinium dichloride,
sodium pentachlorophenate,
sodium trichloroacetate,
sodium trichlorobenzoate,
sodium 2,4-dichlorophenoxy-acetate,
sodium 2,4,5-trichlorophenoxy-acetate, etc.

This list is not limitative and could be extended to include any water-soluble herbicide whether in its sodium, potassium, ammonium or some other salt form.

The aqueous solutions of complementary herbicides are highly ionised and in most cases make incompatible mixtures with low-solubility persistent organic herbicides in the form of pre-prepared aqueous suspensions or of wettable powders.

The reason for this is that formulations for low-solubility persistent organic herbicides to be used in aqueous suspension form necessitate the presence of suspension agents which swell in water, such as carboxymethyl celluloses, cellulose ethyl ethers, alginates, starches and so on, and these suspension agents are very sensitive to the presence of metal ions as are present in the aqueous solutions of complementary herbicides; consequently, aqueous suspensions of the complementary herbicide mixtures with formulations of persistent organic herbicides are not stable.

We have now found that solutions of formulations of persistent herbicides of low water solubility in a suitable organic solvent or mixture of organic solvents are themselves very useful and, unlike the known aqueous suspensions of such formulations, are compatible with aqueous solutions of complementary herbicides, are unaffected by frost, can be stored for as long as required without agitation and can be used with any applicator means.

The organic solvents used must be able to dissolve large amounts of the persistent organic herbicides and must also be such that the solutions according to the invention are stable down to at least —5° C. without crystallisation of the herbicide, without gelling of the vehicle and without any appreciable increase in the viscosity of the solution, in order to remain pourable at low temperatures. As a safety measure, solvents having a flash point below 21° C. should not be used.

As examples of suitable solvents there can be mentioned, interalia, aromatic solvents, such as benzene, toluene, xylene and nitrobenzene, phenolic solvents, such as cresols, nonylphenol and cresylic acid and amides, such as dimethylformamide and dimethylacetamide.

To facilitate the use of solutions of persistent organic herbicides with aqueous solutions of complementary herbicides, the former preferably include surface-active agents of the anionic, cationic or non-ionic kind. In some cases the addition of protective colloids, such as cellulose acetobutyrate, methylethyl cellulose and casein promotes the long-term stability of the suspension or emulsion obtained by mixing the persistent organic herbicide solution with the aqueous solution of complementary herbicide.

According to one aspect of the present invention, the formulations comprise only a persistent organic herbicide as hereinbefore described dissolved in at least one organic solvent such as those hereinbefore described.

We have found that such solutions have outstanding herbicidal properties. We have, in particular, found that there is a synergistic effect between the solvents and the herbicides whereby the effectiveness of the persistent organic herbicides is increased. Even if the solvent used is not itself a herbicide, the solutions according to this invention have properties better than those of the herbicide on its own. If the solvent does have some herbicidal effect, for example, by contact, the observed synergism is evidenced by the fact that the solution has, as well as a considerable contact effect, greater persistence than the persistence of the dissolved herbicide when the same is used alone.

The formulations according to the invention can be in the form of a homogeneous solution, of a heterogeneous solution in a liquid vehicle, of an emulsion or of an aqueous solution.

For instance, one of the herbicides hereinbefore specified can be dissolved in one of the solvents hereinbefore specified, interalia in cresylic acid, and the solution can be treated with caustic soda, the resulting product being soluble in water in any proportion.

The following examples are given by way of illustration only:

EXAMPLE 1

In this example the persistent organic herbicide used is N-(4-chlorophenyl)-N',N'-dimethyl urea, known under the trade name of "Monuron," and the solvent used is a commercial solvent known as meta-para-cresol 50 distilling at from 200 to 206° C.

200 g. of "Monuron" are dissolved in 850 g. of meta-para-cresol at 60° C. and the solution has added to it 80 g. of a surface-active agent known as "Atlox 3335" (the trade name of a mixture of alkylaryl sulphonate with a tall oil ester and sorbitol polyoxyethylene) and 20 g. of cellulose acetobutyrate as protective colloid. This solution is unaffected by being left at a temperature of —5° C. for 2 weeks.

A composition for the total clearance of vegetation is prepared by associating with the solution thus produced, as complementary herbicide, 2,4-D amine (triethylamine 2,4-dichlorophenoxyacetate). To this end, 100 cc. of the previously prepared solution of Monuron in meta-para-cresol is added, with agitation, to 4 cc. of a commercial (50%) solution of 2,4-D amine in 896 cc. of water, to form a very fine suspension of Monuron, some of which settles during the next 3 hours but which is surprisingly easy to return to suspended form thanks to the presence of the protective colloid and the surface-active agent and to the small size of the Monuron particles dissolved in the meta-para-cresol, such particles being much finer than can be obtained by crushing.

EXAMPLE 2

200 g. of N-(3,4-dichlorophenyl)-N',N'-dimethylurea, having the comercial name of "Diuron," are dissolved cold in a mixture of 200 g. of xylene and 700 g. of cresylic acid (cresylic acid is a commercial solvent containing meta-para-cresol, ethylphenol and xylenols and distills between 210 and 225° C.). 40 g. of casein, as protective colloid, and 40 g. of an oleic ether of polyoxyethylene, as surface-active agent, are added to the foregoing solution.

This composition remains stable when stored at —5° C. To 100 cc. of an aqueous solution containing 10 g. of sodium trichloroacetate are added, with slight agitation, 15 cc. of the previously prepared solution of "Diuron" in cresylic acid, to form a stable dispersion of Diuron which can be applied without agitation during the following 2 hours.

EXAMPLE 3

45. g. of polyoxyethylene nonylphenol, a surface-active agent, and 200 g. of Diuron are dissolved cold in a mixture of 550 g. of dimethylformamide and 375 g. of nitrobenzene, and 25 cc. of the resulting solution are added with slight agitation to a solution of 15 g. of sodium chlorate in 100 cc. of water, as a complementary herbicidal solution. This leads to a fine and stable suspension of Diuron in the sodium chlorate solution, and the suspension can be applied immediately by spraying with a sprayer which is not provided with an agitator.

EXAMPLE 4

150 g. of Monuron are added at 50° C. to a solution of 200 g. of polyoxyethylene nonylphenol in 750 g. of nonylphenol. Complete dissolution is obtained.

This solution is compatible with aqueous solutions of complementary herbicides; 15 cc. of this solution are dispersed with slight agitation in 100 cc. of an aqueous solution containing 20 g. of sodium 2,2-dichloropropionate to give an excellent suspension of Monuron. There is a slight deposit after 2 hours, and after 48 hours 25% of the Monuron used has been deposited but can be readily restored to suspension. This herbicidal mixture can be applied by spraying and atomisation.

EXAMPLE 5

200 g. of Diuron are dissolved in a tepid mixture of 700 g. of nonylphenol and 150 g. of xylene, and 150 g. of polyoxyethylene nonylphenol are added to the solution. This solution is stable at —5° C.

15 cc. of this solution are introduced with slight agitation into 85 cc. of an aqueous solution containing 5 g. of aminotriazole and 3 g. of sodium 2,4-dichlorophenoxyacetate. A stable milky emulsion is obtained; after it has been left to stand for 4 hours, there is a slight deposit of Diuron in highly divided form, but is can be returned very readily into suspension.

EXAMPLE 6

200 g. of Monuron are dissolved in a binary solvent prepared by mixing 750 g. of meta-para-cresol with 175 g. of sodium petroleum sulphonate having a molecular weight of 500, and 15 cc. of the resulting solution are poured with slight agitation into 100 cc. of a complementary herbicidal solution containing 10 g. of sodium trichlorobenzoate. A stable and easy-to-apply emulsion is obtained.

EXAMPLE 7

20 g. of N-(dichlorophenyl)-N'-methoxy-N'-methylurea, a persistent organic herbicide, are dissovled in a mixture of 60 g. of dimethylformamide and 35 g. of benzene to which 5 g. of polyoxyethylene nonylphenol has been added; 10 cc. of this preparation are poured into 20 cc. of an aqueous solution containing 10 g. of sodium trichloroacetate as complementary herbicide. A stable emulsion ready for use is obtained.

EXAMPLE 8

15 g. of sodium petroleum sulphonate are added to 75 g. of cresylic acid. The resulting solution has dissolved in it, 20 g. of N-(dichlorophenyl)-N'-methoxy-N'-methylurea, and 15 cc. of this latter solution are poured with agitation into 90 cc. of a solution containing 10 g. of sodium 3-amino-2,5-dichlorobenzoate. A fine dispersion of the urea derivative is obtained which readily stays in suspension for 3 hours; the suspension can be applied without any difficulty.

EXAMPLE 9

150 g. of 5-bromo-3-isopropyl-6-methyl uracil and 100 g. of "Atlox 3335" are dissolved in 750 g. of nitrobenzene; this solution has good stability on low temperature storage. It is added to 90 cc. of a solution containing 15 g. of sodium pentachlorophenate, and a stable ready-for-use emulsion is obtained.

EXAMPLE 10

100 g. of polyoxyethylene nonylphenol and 200 g. of 5-bromo-3-sec-butyl-6-methyl uracil are dissolved in a binary solvent consisting of 400 g. of nitrobenzene and 300 g. of benzene. This solution is unaffected by a temperature of −5° C. for 48 hours. 15 cc. of this preparation, added with agitation to a solution of sodium 2-methyl-4-chlorophenoxyacetate as a complementary herbicide, give a stable emulsion which can be used during the 6 hours after its preparation.

To show the properties of formulations containing a persistent organic herbicide and an organic solvent without any complementary herbicide, comparative tests were carried out using the organic herbicides alone in the form of a wettable powder and the same herbicides dissolved in accordance with the invention.

Ground having a large amount of randomly varied and evenly distributed flora was selected for the experiments.

1,1-dimethyl-3-(3,4-dichlorophenyl)urea was used in a first series of tests. In the control, this herbicide was used at the rate of 3.2 g./m.² The herbicide was applied at the same rate in the other tests but was so dissolved in cresylic acid that 3.2 g. of herbicide and 17 g. of cresylic acid were applied per square metre of ground. To make the test valid, 17 g./m.² of cresylic acid alone was applied to a third plot.

To assess the results of the various products as total herbicides, the controls are the plots treated with herbicide in wettable powder form alone and the corresponding results are given a mark of 10; the results on the other plots are marked from 0 to 20, referred to the standard 10 mark. The following table gives the results we obtained.

The various lines correspond to observations taken every fortnight, the first, 0, line corresponding to application.

TABLE 1

|    | Test No. 1, 3.2 g./m.² powdered herbicide | Test No. 2, 17 g./m.² cresylic acid | Test No. 3, 3.2 g./m.² herbicide +17 g./m.² cresylic acid |
|----|---|---|---|
| 0  |   | Application |   |
| 1  | 10 | 20 | 20 |
| 2  | 10 | 12 | 17 |
| 3  | 10 | 5  | 15 |
| 4  | 10 | 3  | 15 |
| 5  | 10 | 0  | 15 |
| 6  | 10 | 0  | 15 |
| 7  | 10 | 0  | 15 |
| 8  | 10 | 0  | 15 |
| 9  | 10 | 0  | 15 |
| 10 | 10 | 0  | 14 |
| 11 | 10 | 0  | 14 |
| 12 | 10 | 0  | 14 |
| 13 | 10 | 0  | 14 |
| 14 | 10 | 0  | 14 |
| 15 | 10 | 0  | 14 |
| 16 | 10 | 0  | 13 |

This experiment clearly shows that the presence of cresylic acid increases the herbicidal effect of the product, the increase being instantaneous and lasting throughout the 7 month period covered by the experiments.

We then reduced the rate of application of the herbicide on another plot of the same ground, and Table 2 gives the results obtained with half the dose of herbicide used in the control experiment.

TABLE 2

|    | Test No. 1, 3.2 g./m.² powdered herbicide | Test No. 4, 1.6 g./m.² herbicide +8.5 g./m.² cresylic acid |
|----|---|---|
| 0  |   | Application |
| 1  | 10 | 20 |
| 2  | 10 | 17 |
| 3  | 10 | 15 |
| 4  | 10 | 15 |
| 5  | 10 | 15 |
| 6  | 10 | 14 |
| 7  | 10 | 14 |
| 8  | 10 | 14 |
| 9  | 10 | 14 |
| 10 | 10 | 14 |
| 11 | 10 | 13 |
| 12 | 10 | 13 |
| 13 | 10 | 12 |
| 14 | 10 | 12 |
| 15 | 10 | 12 |
| 16 | 10 | 12 |

These results show the advantage of dissolving the herbicide used, i.e. the fact that the quantity of herbicide can be halved to give results very near the results given by the original dose associated with the solvent and in any case very much better than the results given by the original dose used alone.

Further tests were made using the herbicide on its own in the form of a wettable powder at a rate of 1.6g./m.². The results are given in test No. 5 in the following Table 3 and are compared with the results of the previous tests 1 and 4 on the basis on the same standard, i.e. the results given by powdered herbicide alone at a rate of 3.2 g./m.².

TABLE 3

|    | Test No. 1, 3.2 g./m.² powdered herbicide | Test No. 5, 1.6 g./m.² powdered herbicide | Test No. 4, 1.6 g. herbicide +8.6 g./m.² cresylic acid |
|----|---|---|---|
| 0  |    |   | Application |
| 1  | 10 | 0 | 20 |
| 2  | 10 | 0 | 17 |
| 3  | 10 | 4 | 15 |
| 4  | 10 | 4 | 15 |
| 5  | 10 | 4 | 15 |
| 6  | 10 | 5 | 14 |
| 7  | 10 | 5 | 14 |
| 8  | 10 | 6 | 14 |
| 9  | 10 | 6 | 14 |
| 10 | 10 | 6 | 14 |
| 11 | 10 | 7 | 13 |
| 12 | 10 | 7 | 13 |
| 13 | 10 | 7 | 12 |
| 14 | 10 | 6 | 12 |
| 15 | 10 | 6 | 12 |
| 16 | 10 | 6 | 12 |

Other tests were made using as solvent for the 1,1-dimethyl-3-(3,4 dichlorophenyl)urea, a mixture of equal parts of dimethylformamide and nitrobenzene, hereinafter called ND, instead of cresylic acid. Results very comparable to those obtained in the previous tests were obtained with this solvent mixture.

In test No. 6, plots of ground were treated with 3.2 g./m.² of herbicide +12 g./m.² of ND mixture, and the rates of application were halved for test No. 7. Table 4 gives the results obtained.

TABLE 4

| | Test No. 1, 3.2 g./m.² powdered herbicide | Test No. 5, 1.6 g./m.² powdered herbicide | Test No. 6, 3.6 g./m.² herbicide +12 g./m.² ND | Test No. 7, 1.6 g./m.² herbicide +6 g./m.² ND |
| --- | --- | --- | --- | --- |
| 0 | | Application | | |
| 1 | 10 | 0 | 10 | 5 |
| 2 | 10 | 0 | 10 | 6 |
| 3 | 10 | 0 | 10 | 7 |
| 4 | 10 | 4 | 10 | 9 |
| 5 | 10 | 4 | 12 | 10 |
| 6 | 10 | 5 | 12 | 12 |
| 7 | 10 | 5 | 13 | 12 |
| 8 | 10 | 6 | 13 | 12 |
| 9 | 10 | 6 | 13 | 13 |
| 10 | 10 | 6 | 13 | 13 |
| 11 | 10 | 7 | 13 | 13 |
| 12 | 10 | 7 | 12 | 13 |
| 13 | 10 | 7 | 12 | 13 |
| 14 | 10 | 6 | 12 | 12 |
| 15 | 10 | 6 | 12 | 12 |
| 16 | 10 | 6 | 12 | 11 |

The results of test No. 7 are even better than the results of the control test No. 1 and much better than those of test No. 5 in which 1.6 g./m.² of herbicide alone are used.

In another series of tests, 3-bromo-3-isopropyl-6-methyluracil, known under the trade name of "Isocil," was used as the herbicide. Three plots were treated in tests 8, 9 and 10 and the results are given in Table 5.

TABLE 5

| | Test No. 1, 3.2 g./m.² powdered herbicide | Test No. 8, 2 g./m.² powdered "Isocil" | Test No. 9, 1 g./m.² "Isocil" +5 g./m.² cresylic acid | Test No. 10, 1 g./m.² "Isocil" +10 g./m.² cresylic acid |
| --- | --- | --- | --- | --- |
| 0 | | Application | | |
| 1 | 10 | 2 | 5 | 7 |
| 2 | 10 | 2 | 8 | 10 |
| 3 | 10 | 2 | 10 | 10 |
| 4 | 10 | 4 | 12 | 12 |
| 5 | 10 | 5 | 12 | 13 |
| 6 | 10 | 5 | 12 | 15 |
| 7 | 10 | 10 | 12 | 15 |
| 8 | 10 | 10 | 14 | 16 |
| 9 | 10 | 10 | 14 | 16 |
| 10 | 10 | 12 | 16 | 17 |
| 11 | 10 | 12 | 17 | 18 |
| 12 | 10 | 12 | 17 | 18 |
| 13 | 10 | 13 | 16 | 16 |
| 14 | 10 | 13 | 16 | 16 |
| 15 | 10 | 13 | 16 | 16 |
| 16 | 10 | 12 | 16 | 16 |

2 g./m.² of "Isocil" in powder form were used in test No. 8, 1 g./m.² of "Isocil" dissolved in 5 g./m.² of cresylic acid was used in test No. 9, and 1 g./m.² of "Isocil" associated with 10 g./m.² of cresylic acid was used in test No. 10. The results of these three tests are compared with the control test No. 1. Results better than those obtained with 2 g./m.² of "Isocil" in powder form used alone, are obtained with a rate of application as little as 1 g./m.² of "Isocil" dissolved in 5 times its own weight of cresylic acid.

In another series of tests, another formulation of "Isocil" was used. "Isocil" in its enol form forms a water-soluble sodium salt. 1 g. of "Isocil" was dissolved in 6 g. of cresylic acid and to the solution were added 3 cc. of 42% commercial washing soda solution. A clear solution was obtained which is miscible in water in all proportions and is therefore very easy to apply.

This solution was applied to another plot (test No. 11) at the rate of 1 g./m.² of "Isocil" in 6 g. of cresylic acid and 3 cc. of washing soda. The herbicidal action was found to be much greater than for the No. 1 control plot and for the No. 8 plot just described. This test again shows the synergistic effect of a mixture of "Isocil" and cresylic acid; the results are given in the following table.

TABLE 6

| | Test No. 1, 3.2 g./m.² powdered herbicide | Test No. 8, 2 g./m.² powdered "Isocil" | Test No. 11, 1 g./m.² "Isocil" +6 g./m.² cresylic acid +3 cc. NaOH |
| --- | --- | --- | --- |
| 0 | | Application | |
| 1 | 10 | 2 | 7 |
| 2 | 10 | 2 | 10 |
| 3 | 10 | 2 | 10 |
| 4 | 10 | 4 | 12 |
| 5 | 10 | 5 | 13 |
| 6 | 10 | 5 | 14 |
| 7 | 10 | 10 | 15 |
| 8 | 19 | 10 | 15 |
| 9 | 10 | 10 | 16 |
| 10 | 10 | 12 | 16 |
| 11 | 10 | 12 | 18 |
| 12 | 10 | 12 | 18 |
| 13 | 10 | 13 | 18 |
| 14 | 10 | 13 | 18 |
| 15 | 10 | 13 | 18 |
| 16 | 10 | 12 | 18 |

The tests hereinbefore described show that the preparations according to the invention give very good results as herbicides and can be used to effect total clearance of vegetation economically because of the reduced quantities required.

We claim:
1. A herbicidal composition comprising essentially a persistent organic herbicide in a phytotoxic amount in a solution in at least one organic solvent therefor, said persistent organic herbicide being selected from the group consisting of:
(a) N-substituted urea derivatives of the formula

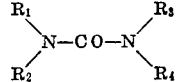

in which $R_1$, $R_2$, $R_3$ and $R_4$ are each selected from the group consisting of hydrogen, lower alkyl, lower alkylol, mononuclear aryl, halo- and nitro-substituted aryl, and acyl and halo-substituted acyl radicals; and
(b) N-substituted uracil derivatives of the formula

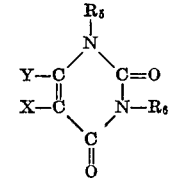

in which $R_5$ and $R_6$ are each selected from the group consisting of hydrogen and lower alkyl, and one of X and Y is lower alkyl and the other of X and Y is halogen;
and said solvent is an oxygen-containing polar organic solvent selected from the group consisting of nitrobenzene, cresols, nonylphenol, cresylic acid, dimethylformamide and dimethylacetamide, and mixtures thereof with an aromatic hydrocarbon.

2. A herbicidal composition as in claim 1; wherein said aromatic hydrocarbon is selected from the group consisting of benzene, toluene and xylene.

3. A herbicidal composition as in claim 1; wherein the weight ratio of said solvent to herbicide is from about 3 to 1 to about 10 to 1.

4. A herbicidal composition as in claim 1; further comprising a surface active agent.

5. A herbicidal composition as in claim 4; wherein said solution further contains a protective colloid.

6. A herbicidal composition as in claim 5; wherein said protective colloid is selected from the group consisting of cellulose acetobutyrate, methylethyl cellulose and casein.

7. A herbicidal composition as in claim 1; wherein said persistent organic herbicide is selected from the group consisting of N-(4-chlorophenyl)-N',N'-dimethylurea, N-(3,4-dichlorophenyl)-N',N-(dichlorophenyl)-N'-methoxy- N'-methylurea, 5-bromo-3-isopropyl-6-methyl-uracil, and 5-bromo-3-sec. butyl-6-methyl-uracil.

8. A herbicidal composition as in claim 1; and an aqueous solution of a compatible complementary water soluble herbicide.

9. A herbicidal composition according to claim 8 which also comprises a surface active agent.

10. A herbicidal composition according to claim 8 which also comprises a protective colloid.

11. A herbicidal composition according to claim 10, wherein said protective colloid is selected from the group consisting of cellulose acetobutyrate, methylethyl cellulose and casein.

12. A method of clearing ground of vegetation which comprises the step of applying the herbicidal composition claimed in claim 1 to the area to be cleared at such a rate as to supply at least 1 gram of said persistent organic herbicide per square meter.

13. A method of clearing ground of vegetation which comprises the step of applying the herbicidal composition claimed in claim 1 to the area to be cleared at such a rate as to supply from about 1 gram to about 3.2 grams of said persistent organic herbicide per square meter.

References Cited

UNITED STATES PATENTS 2,709,648   5/1955   Ryker _____ 71—2.5

FOREIGN PATENTS 1,270,771   7/1961   France.
1,344,628   10/1963   France.

OTHER REFERENCES

Weed Control Handbook, 3rd edition (1963), SB611, B67, 1963, pages 8, 9, 11, 12, 12S.

Crafts—The Chemistry and Mode of Action of Herbicides, SB611, C7, C2 (1961), pages 12 and 13.

JAMES O. THOMAS, JR., *Primary Examiner.*

U.S. Cl. X.R.

71—119, 82, 120